US008239417B2

(12) United States Patent
Gu et al.

(10) Patent No.: US 8,239,417 B2
(45) Date of Patent: Aug. 7, 2012

(54) SYSTEM, METHOD, AND COMPUTER PROGRAM PRODUCT FOR ACCESSING AND MANIPULATING REMOTE DATASETS

(75) Inventors: Bei Gu, Hillsborough, NJ (US); Kenneth Howard, Stoney Point, NY (US); Eric J. Kaplan, Allendale, NJ (US); Peter Chirlian, Basking Ridge, NJ (US); Aleksandr Shukhat, Milburn, NJ (US)

(73) Assignee: Armanta, Inc., Morristown, NJ (US)

( * ) Notice: Subject to any disclaimer, the term of this patent is extended or adjusted under 35 U.S.C. 154(b) by 314 days.

(21) Appl. No.: 12/188,126

(22) Filed: Aug. 7, 2008

(65) Prior Publication Data

US 2010/0036824 A1    Feb. 11, 2010

(51) Int. Cl.
G06F 17/30 (2006.01)
G06F 15/16 (2006.01)
(52) U.S. Cl. ......... 707/796; 707/797; 707/805; 709/203
(58) Field of Classification Search .................. 707/600, 707/603, 607, 609, 610–614, 802, 827, 829, 707/790–795, 796–797, 805; 705/1–2, 14, 705/26–27, 30; 709/203–204, 215–220
See application file for complete search history.

(56) References Cited

U.S. PATENT DOCUMENTS

| | | | | |
|---|---|---|---|---|
| 5,414,809 A * | 5/1995 | Hogan et al. | ............... | 715/765 |
| 6,161,125 A * | 12/2000 | Traversat et al. | ............... | 709/203 |
| 6,278,452 B1 * | 8/2001 | Huberman et al. | ............ | 715/764 |
| 6,321,241 B1 * | 11/2001 | Gartung et al. | ............... | 715/210 |
| 6,751,789 B1 * | 6/2004 | Berry et al. | ................. | 717/130 |
| 7,181,422 B1 * | 2/2007 | Philip et al. | .................. | 705/36 R |
| 7,346,589 B1 * | 3/2008 | Camden et al. | ............... | 705/400 |
| 7,376,654 B1 | 5/2008 | Chau et al. | | |
| 7,457,822 B1 * | 11/2008 | Barrall et al. | ......... | 1/1 |
| 7,722,130 B2 * | 5/2010 | Takeuchi | ..................... | 303/9.64 |
| 2002/0063734 A1 * | 5/2002 | Khalfay et al. | ............... | 345/744 |
| 2004/0153967 A1 | 8/2004 | Bender et al. | | |

(Continued)

OTHER PUBLICATIONS

R. Kesler et al. "Implementing concurrent scheme for the Mayfly distributed parallel processing system", LISP and Symbolic computation: An international Journal, 1992, pp. 1-21.*

(Continued)

*Primary Examiner* — Srirama Channavajjala
(74) *Attorney, Agent, or Firm* — Stern, Kessler, Goldstein & Fox PLLC

(57) ABSTRACT

A method, system and computer program product for creating a report on the basis of a plurality of remote datasets. The system for achieving this includes an intelligence server, connected to one or more tree servers. The tree servers are in turn connected to one or more databases. A user specifies a report to be created by the system. A client, acting on behalf of the user, creates a report definition that is sent to the intelligence server and the tree servers. Each tree server creates one or more segments, or slices, of the report, using the information that resides on the tree server. These slices are then sent to the intelligence server, which aggregates the slices into a tree structure. The tree structure is then converted into a report for presentation to the client. Moreover, the intelligence server receives updates from the tree servers as necessary. To do so, the tree servers and the intelligence server remain in communication for the purposes of passing update messages. The update messages are received and processed at the intelligence server in a manner that facilitates synchronization with the contributing tree servers and provides live updates to the user.

8 Claims, 14 Drawing Sheets

U.S. PATENT DOCUMENTS

| | | | |
|---|---|---|---|
| 2004/0162772 A1* | 8/2004 | Lewis | 705/34 |
| 2004/0168115 A1* | 8/2004 | Bauernschmidt et al. | 715/500 |
| 2004/0205058 A1* | 10/2004 | Kiji | 707/3 |
| 2005/0149583 A1* | 7/2005 | Baskaran et al. | 707/203 |
| 2005/0171833 A1 | 8/2005 | Jost et al. | |
| 2005/0198103 A1* | 9/2005 | Ching | 709/200 |
| 2006/0047640 A1* | 3/2006 | Ono et al. | 707/3 |
| 2006/0064428 A1* | 3/2006 | Colaco et al. | 707/101 |
| 2006/0161525 A1 | 7/2006 | Bordawakar et al. | |
| 2006/0190503 A1* | 8/2006 | Naicken et al. | 707/204 |
| 2006/0271583 A1* | 11/2006 | Hulen et al. | 707/102 |
| 2006/0288311 A1* | 12/2006 | Heer et al. | 715/853 |
| 2007/0162375 A1* | 7/2007 | Delf | 705/36 R |
| 2007/0276901 A1* | 11/2007 | Glinsky et al. | 709/203 |
| 2008/0001751 A1* | 1/2008 | Gieseke et al. | 340/572.1 |
| 2008/0097974 A1* | 4/2008 | Chen et al. | 707/4 |
| 2009/0300032 A1* | 12/2009 | Chirlian et al. | 707/100 |
| 2010/0287512 A1* | 11/2010 | Gan et al. | 715/854 |

OTHER PUBLICATIONS

Feng Huang et al. "A Virtual Machine Server Aggregation Algorithm based on Hierarchical Clustering",2009 15th International Conference on Parallel and Distributed Systems, pp. 931-936.*

Jincai Chen et al. "GSM-R: A_Hybrid Scheduling Approach to Dynamic Load Balancing in Hierarchical Cluster of Servers",International Conference on Networking, Architecture, and Storage (NAS 2007), 7 pages.*

Robin La Fontaine, "Merging XML Files: A New Approach Providing Intelligent Merge of XML Data Sets," XML Europe 2002, May 23, 2002, 21 pages.

PCT, "International Search Report and Written Opinion of the International Search Authority for International Appln. No. PCT.US2009/004554," mailed Nov. 18, 2009, 15 pages.

* cited by examiner

|  | Units | Mkt. Value |
|---|---|---|
| Total |  | 286,000 |
| Sector x |  | 55,000 |
| Portfolio A |  | 55,000 |
| Holding 0 | 300 | 30,000 |
| Holding 1 | 1,000 | 25,000 |
| Sector y |  | 231,000 |
| Portfolio A |  | 215,000 |
| Holding 2 | 500 | 5,000 |
| Holding 3 | 7,000 | 210,000 |
| Portfolio B |  | 16,000 |
| Holding 4 | 1,000 | 10,000 |
| Holding 5 | 2,000 | 6,000 |

|  | Units | Mkt. Value |
|---|---|---|
| Total | | 703,000 |
| Portfolio C | | 447,000 |
| Sector I | | 253,000 |
| Holding 6 | 1,000 | 100,000 |
| Holding 7 | 500 | 3,000 |
| Holding 8 | 1,000 | 150,000 |
| Sector J | | 194,000 |
| Holding 9 | 1,000 | 170,000 |
| Holding 10 | 800 | 24,000 |
| Portfolio D | | 256,000 |
| Sector K | | 166,000 |
| Holding 11 | 2,000 | 160,000 |
| Holding 12 | 500 | 6,000 |
| Sector L | | 90,000 |
| Holding 13 | 1,000 | 90,000 |

FIG. 4B

SYSTEM, METHOD, AND COMPUTER PROGRAM PRODUCT FOR ACCESSING AND MANIPULATING REMOTE DATASETS

CROSS REFERENCE TO RELATED APPLICATIONS

Not applicable.

STATEMENT REGARDING FEDERALLY-SPONSORED RESEARCH AND DEVELOPMENT

Not applicable.

BACKGROUND OF THE INVENTION

1. Field of the Invention

The invention described herein relates to dataset access and processing, and in particular relates to the organization of networked servers in support of dataset processing.

2. Background Art

It is a common requirement for a user to have to access a large body of information in some organized manner. Typically, the user acts through a graphical user interface and a client machine or process, to access a server. The server may retrieve data from a database and build a report that is then forwarded to the client. In order for the server to accomplish this, the server needs to have or obtain all the data needed to create the report. For large datasets, the server needs to have significant storage and processing capability. For large reports and large datasets, this can be a problem. Generally, such an architecture functions smoothly for smaller information retrieval problems. Scalability to larger datasets, however, is problematic. In particular, memory requirements and processing throughput can strain the operation of such an architecture, particularly if the user requires frequent or near real time updates.

One way of dealing with the scalability problem is to have multiple servers at the disposal of a given client. While this would seem to multiply the capabilities of such a system, the fact remains that for any given requested report, the accessed server still needs to have all the data required for that report. Therefore, scalability problems remain. The same issues of throughput, responsiveness, and storage capacity persist. Moreover, such an architecture can be inefficient. In some situations the same data may have to be loaded on multiple servers. Consider, for example, the problem of a user trying to create a report dealing with financial investment information. If a database contains information relating to four investment portfolios, different reports may require different portfolios. If we call the available portfolios 1, 2, 3, and 4, assume that a first report A requires portfolios 1, 2, and 3. Say that a second report B requires portfolios 2, 3, and 4. A first server may be tasked with creating report A. In this case, the server would require portfolios 1 through 3. If a second user requires report B, then a second server would require portfolios 2 through 4. In this case, portfolios 2 and 3 are loaded twice. Portfolios 2 and 3 will be loaded on the first server, as well as on the second server. This represents an inefficiency. The information relating to portfolios 2 and 3 is necessarily loaded onto both the servers. Therefore, even though multiple servers may be available for a community of users, problems remain as to inefficiency, scalability, and throughput.

What is needed, therefore, is a flexible architecture that allows fast and responsive processing of large datasets. Such an architecture should minimize redundancy and inefficiency. Moreover, such an architecture should be scalable, so that larger communities of users and larger datasets may be accommodated.

BRIEF DESCRIPTION OF THE DRAWINGS/FIGURES

FIGS. 4A and 4B illustrate example reports generated in an embodiment of the invention.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

I. Introduction

The invention described herein includes a method, system and computer program product for creating a report on the basis of a plurality of remote datasets. The system for achieving this includes an intelligence server, connected to one or more tree servers. The tree servers are in turn connected to one or more databases. A user specifies a report to be created by the system. A client, acting on behalf of the user, creates a report definition that is sent to the intelligence server and the tree servers. Each tree server creates one or more segments, or slices, of the report, using the information that resides on the tree server. These slices are then sent to the intelligence server, which merges the slices into a tree structure. The tree structure is then converted into a report for presentation to the client. Moreover, the intelligence server receives updates from the tree servers as necessary. To do so, the tree servers and the intelligence server remain in communication for the purposes of passing update messages. The update messages are received and processed at the intelligence server in a manner that facilitates synchronization with the contributing tree servers and provides live updates to the user.

II. Traditional Approach

Figure 1:
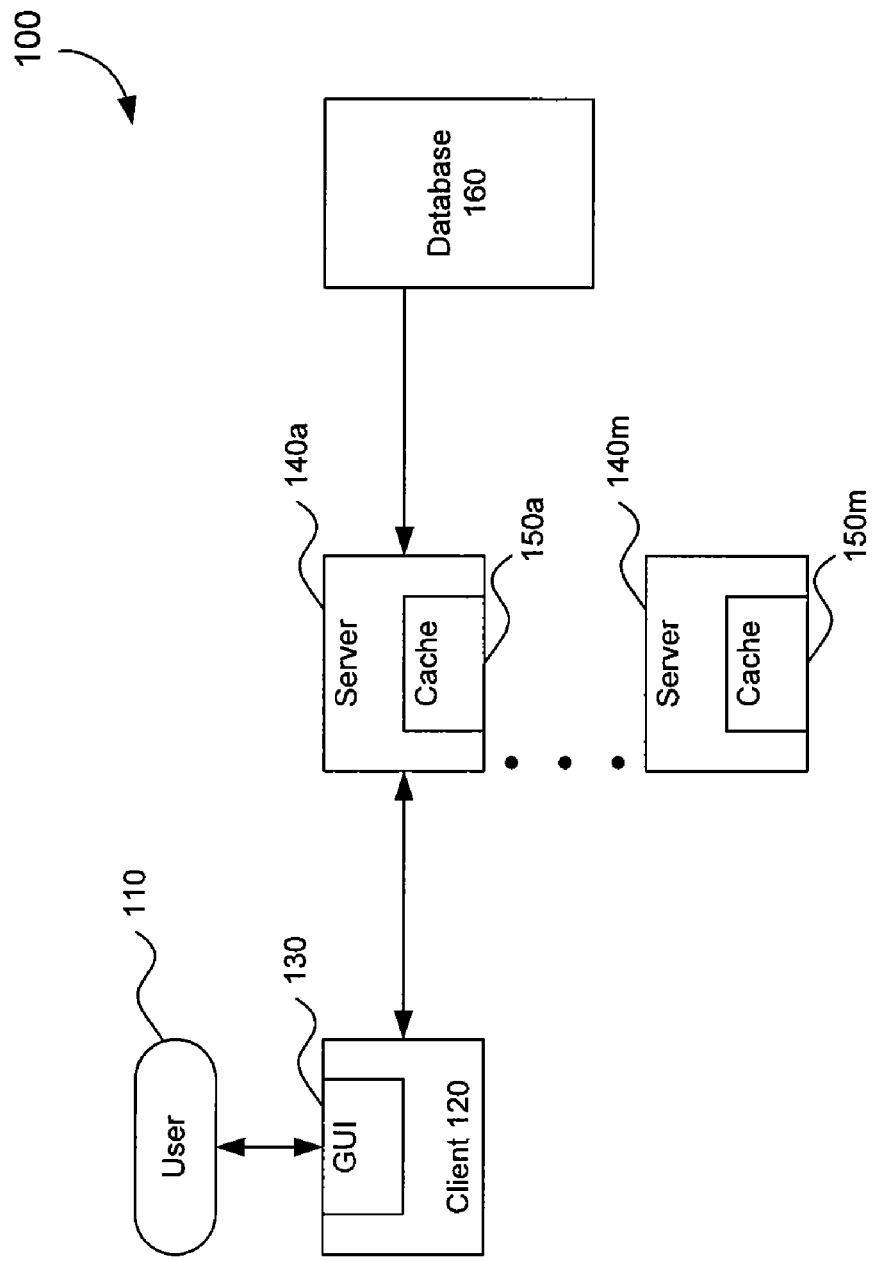
FIG. 1 is a block diagram illustrating an approach to the accessing and processing of datasets.

A conventional architecture through which a user can access and process a dataset, is illustrated in FIG. 1. A user 110 is shown interacting with a client 120. This can be achieved through a graphical user interface (GUI) 130. The client 120 is in communication with one or more servers 140a through 140m. Each of the servers is in communication with a database 160. User 110 specifies a desired report to client 120, via GUI 130. This request is then passed, for example, to server 140a. Server 140a then retrieves the data necessary for the report from database 160. The necessary information is received from database 160 and stored in a cache 150a. Server 140a then uses the information stored in cache 150a to create a report that is returned to client 120. User 110 can then access the report via GUI 130. Alternatively, the client 120 may access additional servers 140. This may be desirable to create respective additional reports. As discussed above, this approach is not readily scalable, and is prone to inefficiencies. Large datasets can be difficult to store and process by a single server. In addition, data may have to be replicated across multiple servers in order to create the necessary reports.

III. Architecture

Figure 2:
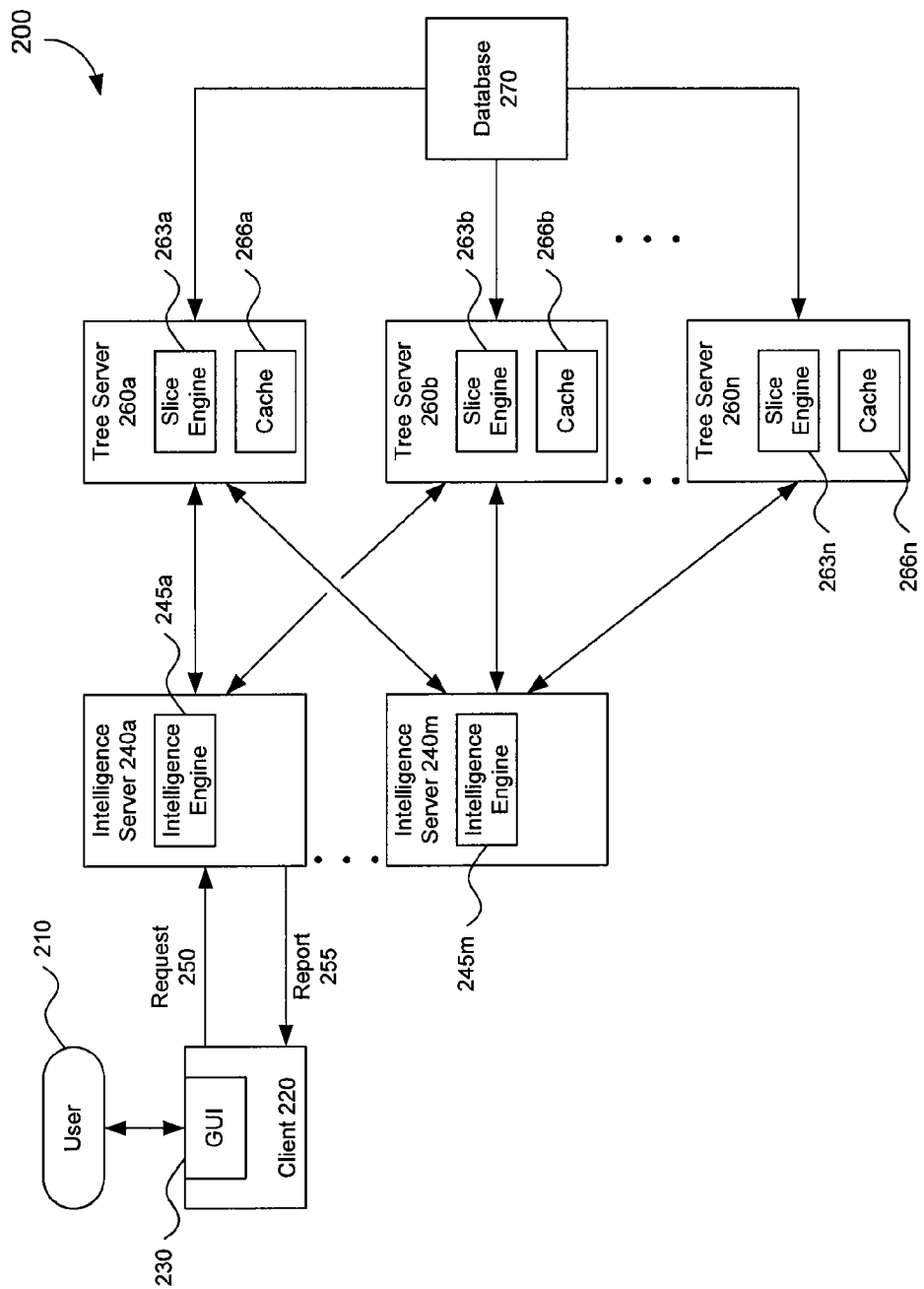
FIG. 2 is a block diagram illustrating an approach to the accessing and processing of datasets according to an embodiment of the invention.

FIG. 2 illustrates the architecture of an embodiment of the invention. As before, a user 210 interacts with the system through a client 220. In an embodiment of the invention, user 210 interacts with the system through a graphical user interface 230. A request 250 for a report is generated and sent to an intelligence server 240a. Intelligence server 240a then communicates with one or more tree servers 260. The tree servers retrieve the necessary data from a database 270. A definition of the requested report is maintained by both the intelligence server 240a and the tree servers that are used to complete the report. Based on the report definition, the tree servers request the appropriate data from database 270. In the illustrated embodiment, the requested report is serviced by tree server 260a and tree server 260b.

Data retrieved by the tree servers from database 270 is stored in a cache in each of the respective tree servers. Information from database 270 that is being processed by tree server 260a is stored in cache 266a. Information from database 270 that is being processed by tree server 260b is stored in a cache 266b. Each tree server uses this information to build one or more slices of a tree that stores and organizes the information to be used for the final report. The construction of the slices is performed by slice engines 263a and 263b respectively. When completed, the slices are sent to intelligence server 240a. The slices are here processed by intelligence engine 245a. The intelligence engine receives the slices, and merges them in order to construct the tree data structure on which the final report will be based. When the merge is complete, the tree is converted into a report that may take the form of a matrix, such as a spreadsheet. The report 255 is then sent to client 220. The report 255 can then be accessed by user 210 through GUI 230.

In the illustrated embodiment, a plurality of tree servers is present, as well as a plurality of intelligence servers. Any of the intelligence servers can communicate with any subset of the tree servers. Intelligence server 240m, for example, is shown in communication with tree servers 260a, 260b, and 260n. This arrangement allows for the sharing of information that may reside in any given tree server. For example, tree server 260b may have received some number of records from database 270. Slice engine 263b of tree server 260b may then construct one or more slices to be used by intelligence server 240a. Tree server 260b may create other slices based on the same records to be used in the creation of slices that are then sent to intelligence server 240m. Any given tree server 260 may therefore service more than one intelligence server.

Figure 3:
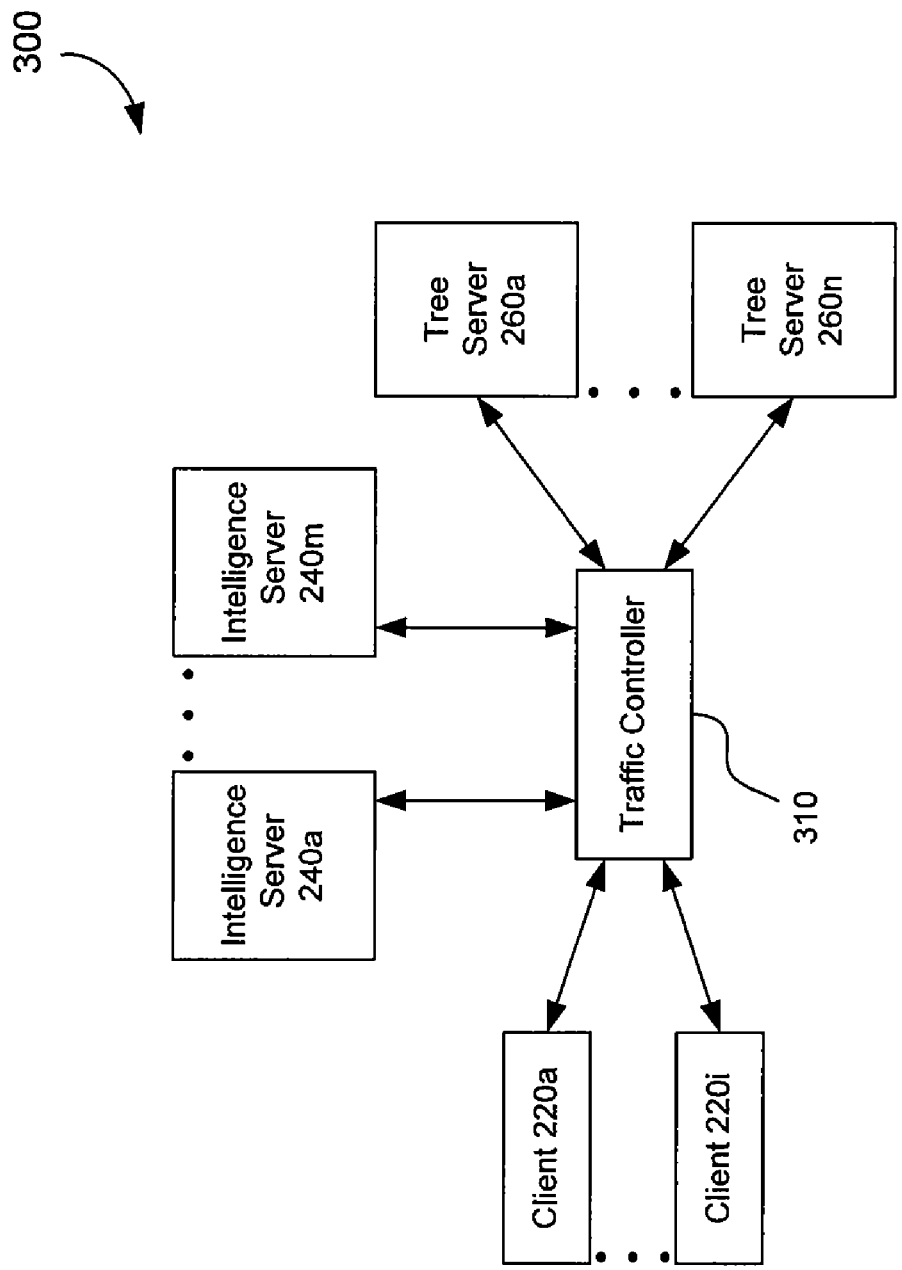
FIG. 3 is a block diagram illustrating the interaction of a traffic controller with other components according to an embodiment of the invention.

In an embodiment of the invention, communications between clients and intelligence servers, and between intelligence servers and tree servers, may be mediated by a traffic controller. This is illustrated in FIG. 3. Here, clients 220a through 220i are in communication with intelligence servers 240a through 240m. When any given client seeks to make a request for a report to one of the intelligence servers, the request is processed by traffic controller 310. In the illustrated embodiment, traffic controller 310 is aware of the current load being placed on each of the intelligence servers. Traffic controller 310 will then direct the client to an appropriate intelligence server. In addition to current capacity, other factors may be used in determining which intelligence server to make available to a given client. Another factor may be, for example, geographic proximity. Given factors related to network latency, it may make sense for a given client to be connected to a relatively close intelligence server.

In a similar manner, a given intelligence server will need to communicate with one or more tree servers. The traffic controller 310 can mediate this interaction as well. The traffic controller 310 will be aware of the current load being placed on all of the tree servers 260. Traffic controller 310 may also be aware of the data that is in residence at each of the tree servers 260. This allows the traffic controller to direct the intelligence servers to a tree server that has the processing capacity to deal with a report request, and that may have the data necessary to fulfill the request. Again, additional factors may come into play in the selection of the tree servers. As before, these factors may include geographic proximity or network topological considerations.

IV. Examples Of Reports

Examples of reports that can be generated by this architecture are illustrated in FIGS. 4A and 4B. In FIG. 4A, the user has requested a report that is first broken down by sectors. These are shown as sectors x and y. In the realm of financial investments, sectors can include, for example, energy, banking, retail, etc. In the report shown, the sectors are subdivided into portfolios. Sector x is shown with a portfolio A. Sector y is shown with two portfolios, A and B. Within each portfolio are individual holdings. Within portfolio A, holding 0 and holding 1 are present. These two holdings represent holdings in portfolio A that correspond to sector x. Under sector y, portfolio A includes holdings 2 and 3. Also under sector y, portfolio B holds holdings 4 and 5. Holdings 2, 3, 4, and 5 represent holdings that are associated with sector y.

A second example of a report is shown in FIG. 4B. Here, the report is broken down initially by portfolio. In this report, the portfolios are shown as portfolios C and D. Portfolio C includes holdings from two sectors I and J. There are three holdings in sector I in portfolio C, holdings 6, 7, and 8. There are two holdings in sector J in portfolio C. These are holdings 9 and 10. Portfolio D includes two different sectors, sectors K and L. The sector K holdings in portfolio D are shown as holdings 11 and 12. Sector L in portfolio D includes holding 13. As before, for each holding, a number of statistics are shown. In the example of FIG. 4B, for each holding, the number of units are shown, as well as the total market value of that number of units or shares for that holding.

V. Example Tree Structure

Figure 5:
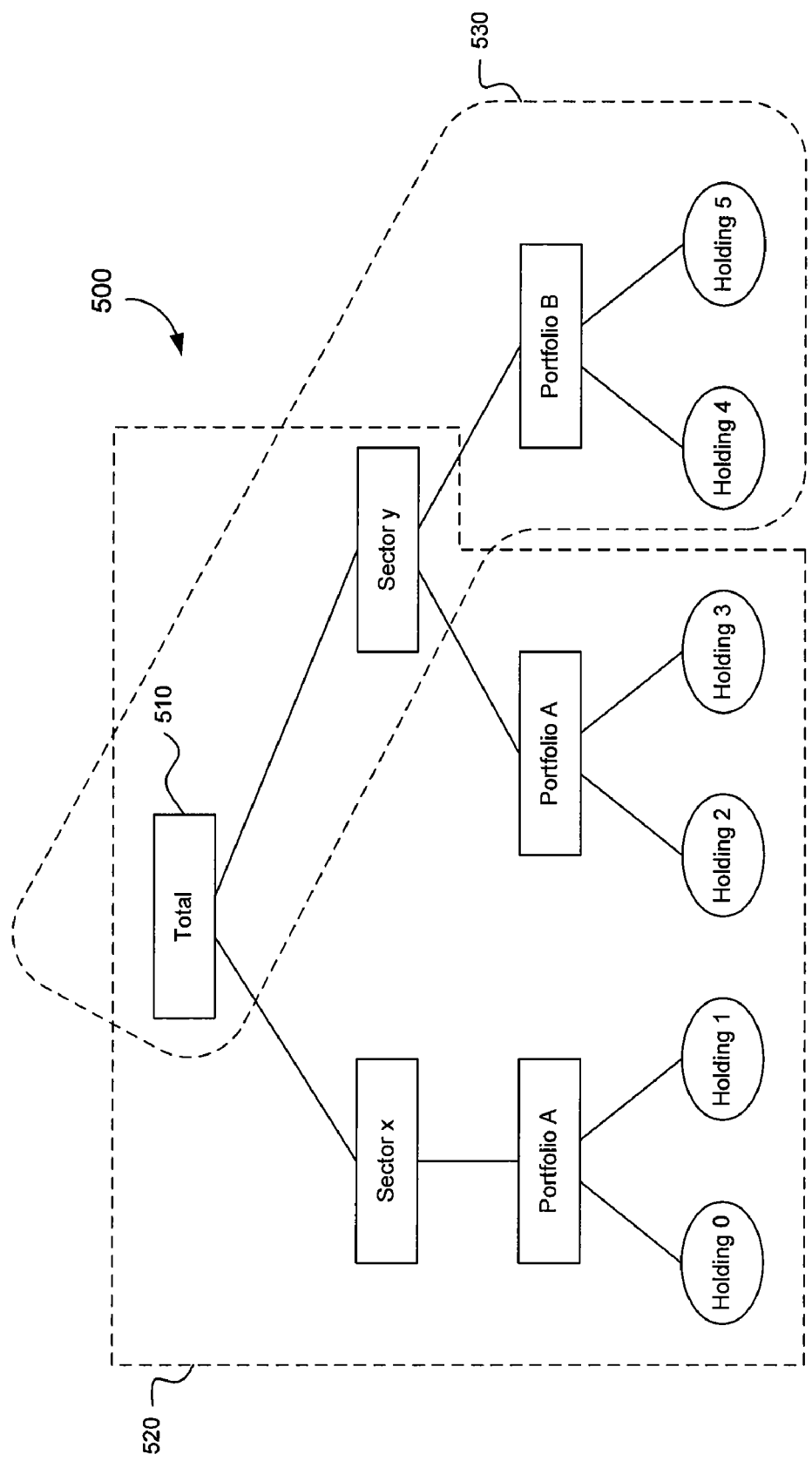
FIG. 5 illustrates the organization of data in a tree structure that can be used to create a report, according to an embodiment of the invention.

An example tree structure is shown in FIG. 5. The illustrated tree structure 500 could be used to generate the report shown in FIG. 4A. The topmost node in tree 500 is shown as the total 510. Under the total 510 are the two sectors x and y. As discussed above, sector x includes portfolio A, which includes holdings 0 and 1. Sector y includes holdings from two portfolios, portfolios A and B. Under sector y, portfolio A includes holdings 2 and 3, while portfolio B includes holdings 4 and 5. Subtree 520 includes portfolio A and its subordinate holdings, under both sectors x and y. Subtree 520 also includes the nodes that occur above (and logically include) these portfolio nodes, i.e., the sector nodes x and y, and the total node. Subtree 520 can be viewed as a slice. The slice 520 would have been generated by a tree server and sent to the intelligence server for aggregation into tree 500. As will be discussed in greater detail below, the tree server retrieves necessary data from a database, in order to create slice 520. Slice 520 is then sent to a requesting intelligence server. Likewise, a tree server would generate slice 530. This slice includes holdings 4 and 5, plus all nodes that occur above (and logically include) these holdings. The tree server that generates slice 520 may be different from the tree server that generates slice 530; alternatively, both may originate with the same tree server. All portions of a tree for a given dataset are contained in the same slice. Slices 520 and 530 are all sent by the generating tree servers to the requesting intelligence server. At the intelligence server, the intelligence engine therein merges the slices 520 and 530, on the basis of the report definition. Nodes common to both slices are merged, i.e., the total and sector y nodes in this example. The result is the tree 500. The tree 500 would then be converted into the report shown in FIG. 4A.

VI. Processing

Figure 6:
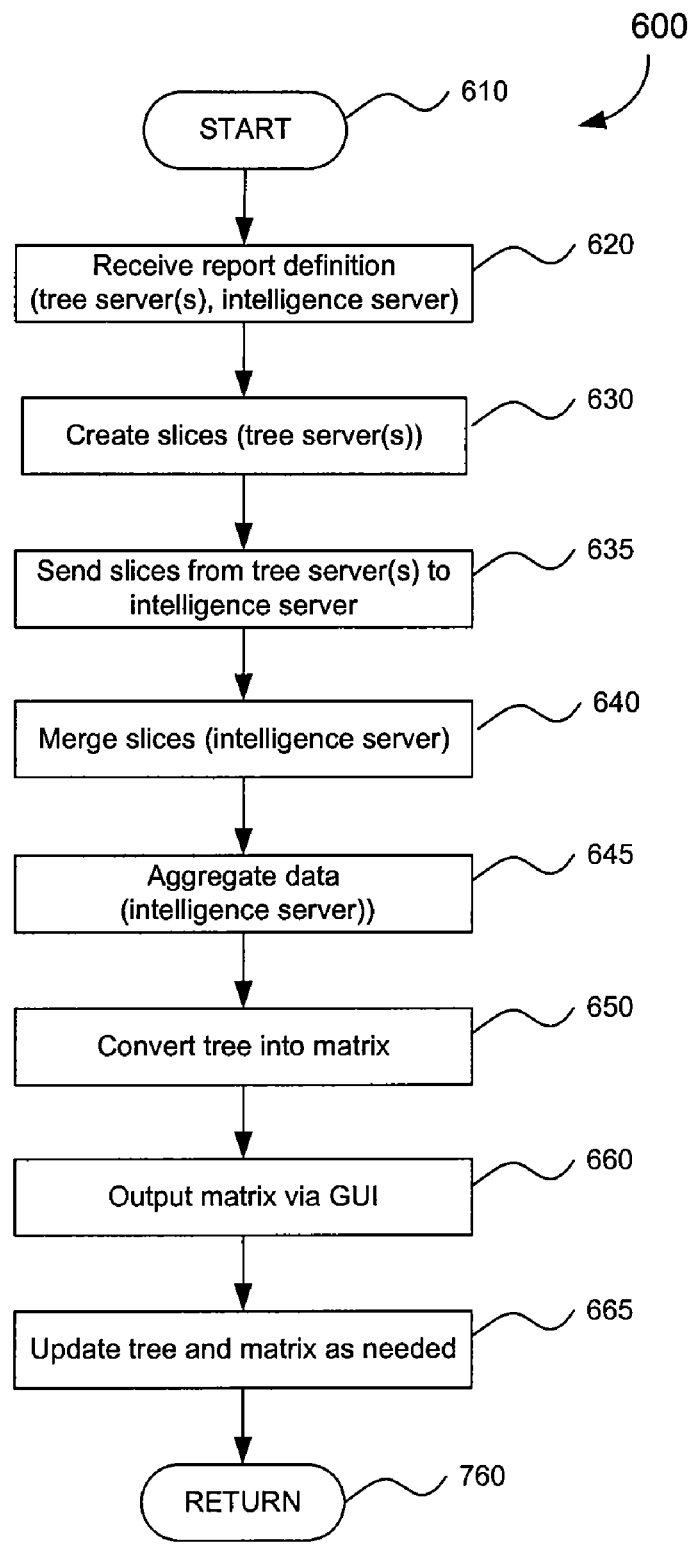
FIG. 6 is a flow chart illustrating the overall processing of an embodiment of the invention.

The processing of an embodiment of the invention is illustrated in FIG. 6. The process described here assumes that the traffic controller has already specified which tree servers will be used by an intelligence server in building the report. The process begins at step 610. In step 620, a definition of a requested report is received by both the intelligence server and the tree servers. In step 630, slices are created at one or more tree servers. This step will be discussed in more detail below. In step 635, the slices are sent to the intelligence server, where they are merged (step 640) by the intelligence engine in the intelligence server. In step 645, the intelligence engine aggregates the data contained and organized in the slices. Aggregation refers to the population of nodes of the tree on the basis of the leaf node data and on the operations defined by the report.

Note that aggregation may take different forms, depending on the requirements of the report. If, for example, the user is only interested in determining a statistic such as the total market value of holdings in the report, then the aggregation processing requires that values at a given node represent the sum of values at immediately subordinate nodes. Referring back to FIG. 5, for example, the market valued of holdings 0 and 1 in slice 520 would be added to create a value for portfolio A. This value would be the same for sector X, since no other portfolios contribute to the value at the sector X node. The market values of holdings 2 and 3 of slice 520 would be combined to form a value for portfolio A under sector Y, and the market values of holdings 4 and 5 (slice 530) would be added to form a value for portfolio B. The values of portfolios A and B from slices 520 and 530 would be added to create a value for sector Y. The total 510 would be the sum of the values at the nodes representing sectors X and Y. The resulting total 510 for an aggregation such as this does not depend on the order of subordinate operations, and can therefore be viewed as associative.

Not all aggregations may be associative. Some aggregation operations rely on values held at the leaf nodes for some or all of the operations at the higher level nodes (i.e., nodes above the leaf level). Such aggregations are referred to herein as leaf aggregations.

Returning to FIG. 6, once the slices have been merged and aggregation for the tree has been completed, in step 650 the tree structure can be converted into a form that is more user friendly, such as a table or matrix, such as a spreadsheet. In step 660, the matrix is output to the client and presented to the user through the GUI. In step 665, the tree (and the matrix) can be updated as necessary. This update process may take place automatically because the underlying data in the database has changed. Alternatively, the user may request that the report be updated with the most current data, or may vary the report definition. The user may, for example, become interested in additional portfolios or sectors, or may wish to ignore others.

Figure 7:
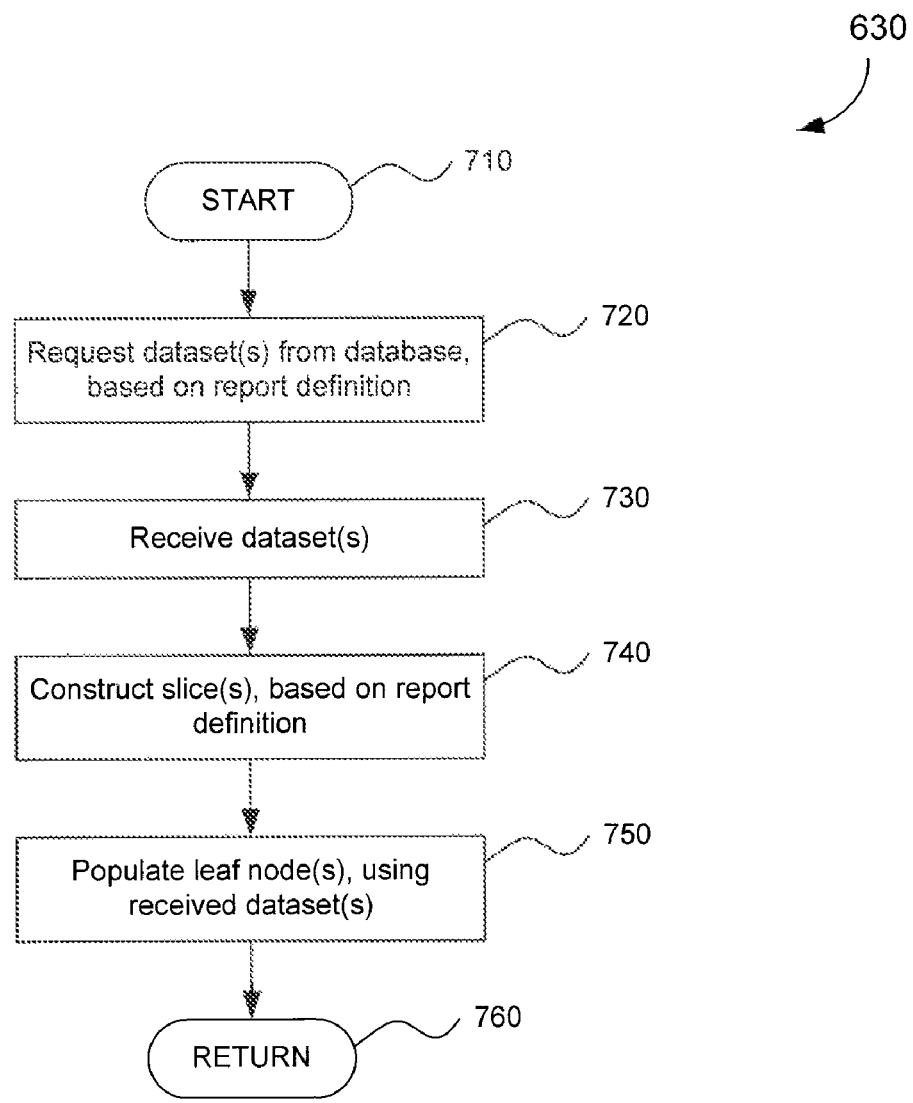
FIG. 7 is a flow chart illustrating the creation of tree slices according to an embodiment of the invention.

The process of constructing a slice at a tree server is illustrated in greater detail in FIG. 7. The process begins at step 710. At step 720, the tree server requests one or more datasets from the database, where the request is based on the report definition received in step 620 of FIG. 6. The dataset(s) are received in step 730. In step 740, the slice is constructed on the basis of the report definition. As described above with respect to FIG. 5, a slice can be viewed as a subtree. In step 750, the leaf nodes are populated from the information in the dataset. This may include aggregation at the leaf node level. Where a leaf node consists of entities from multiple datasets, values are separately aggregated using data from each dataset. The process concludes at step 760.

Figure 8A:
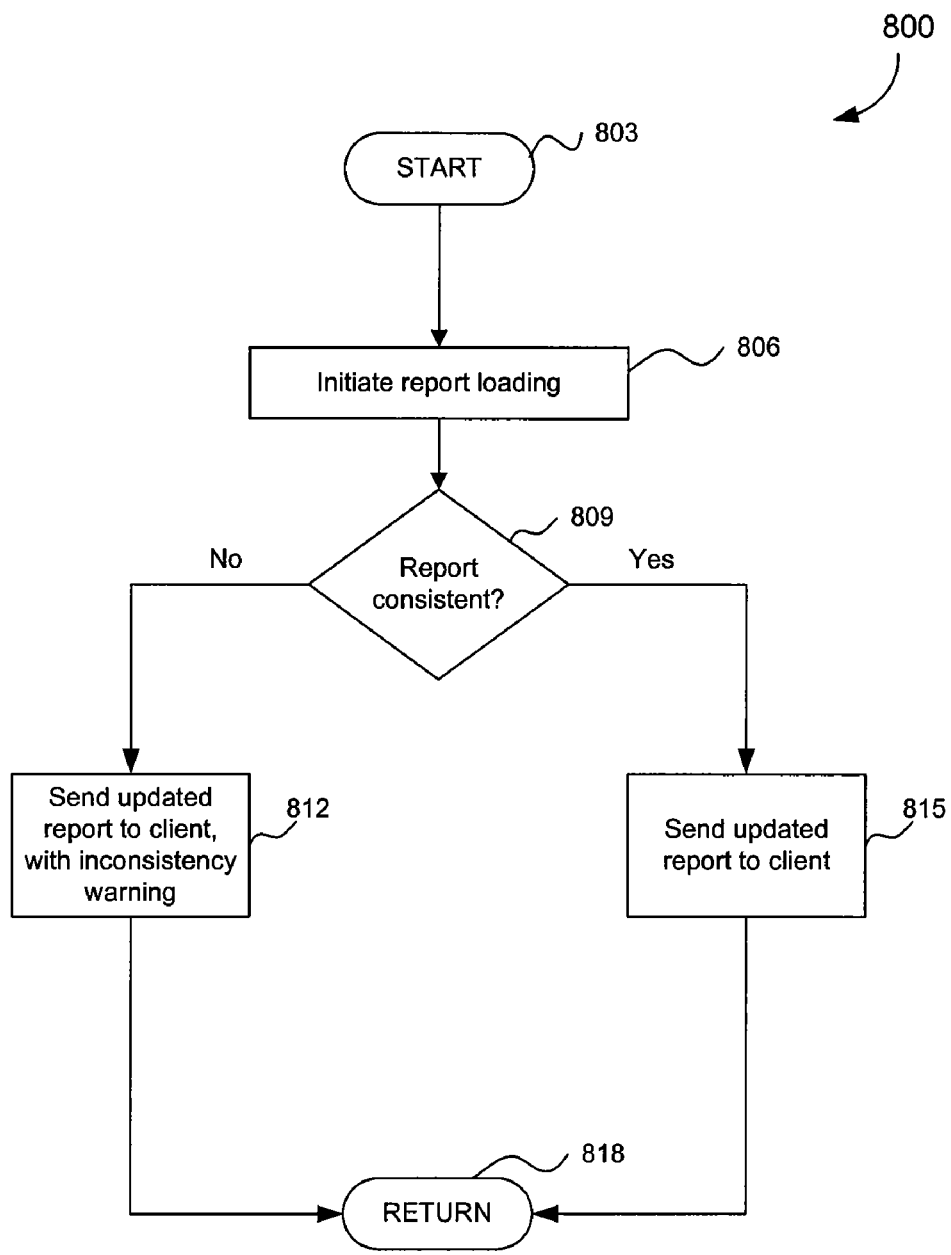
FIGS. 8A-8C illustrate the update and synchronization process between tree servers, an intelligence server, and a client, according to an embodiment of the invention.
Figure 8B:
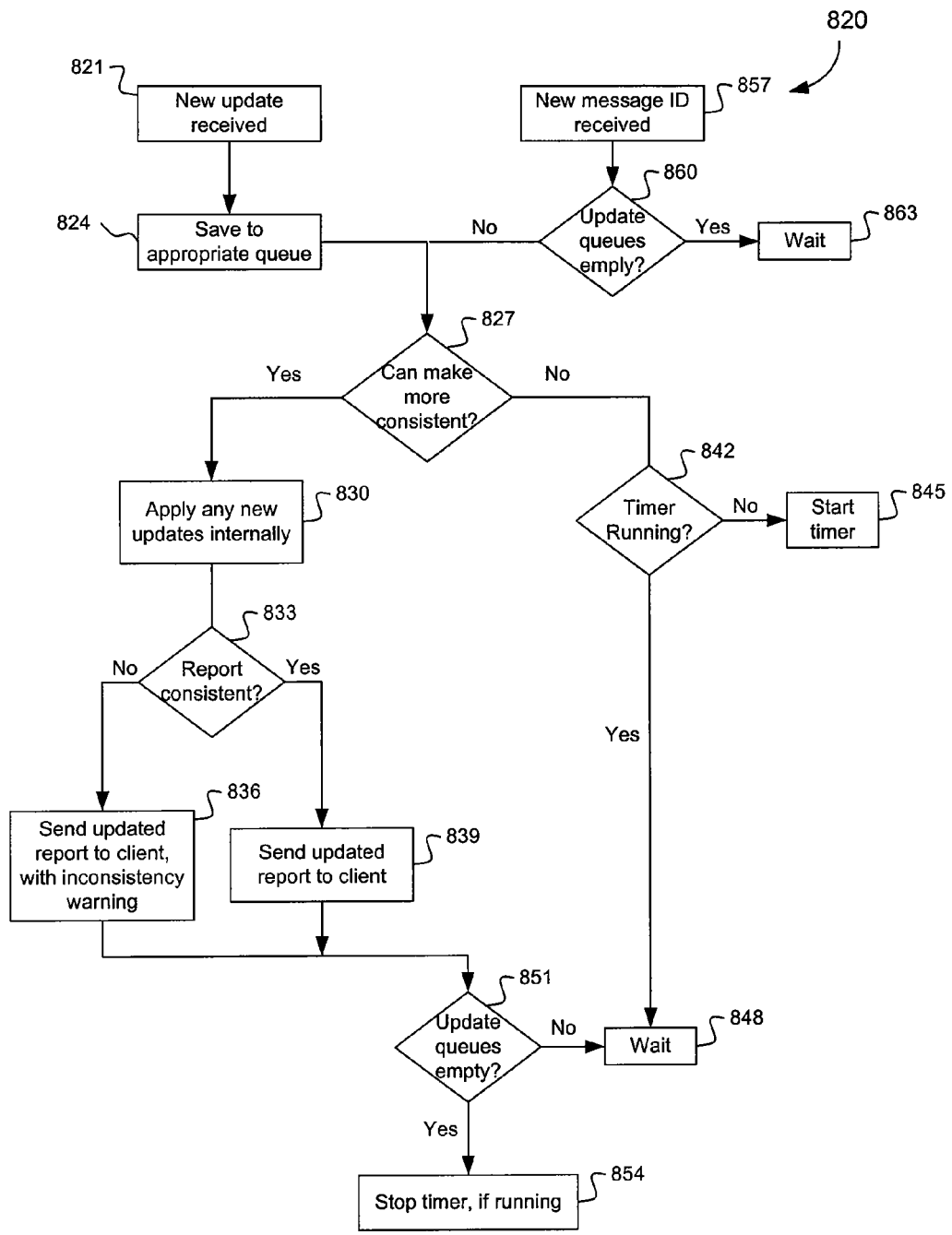
Figure 8C:
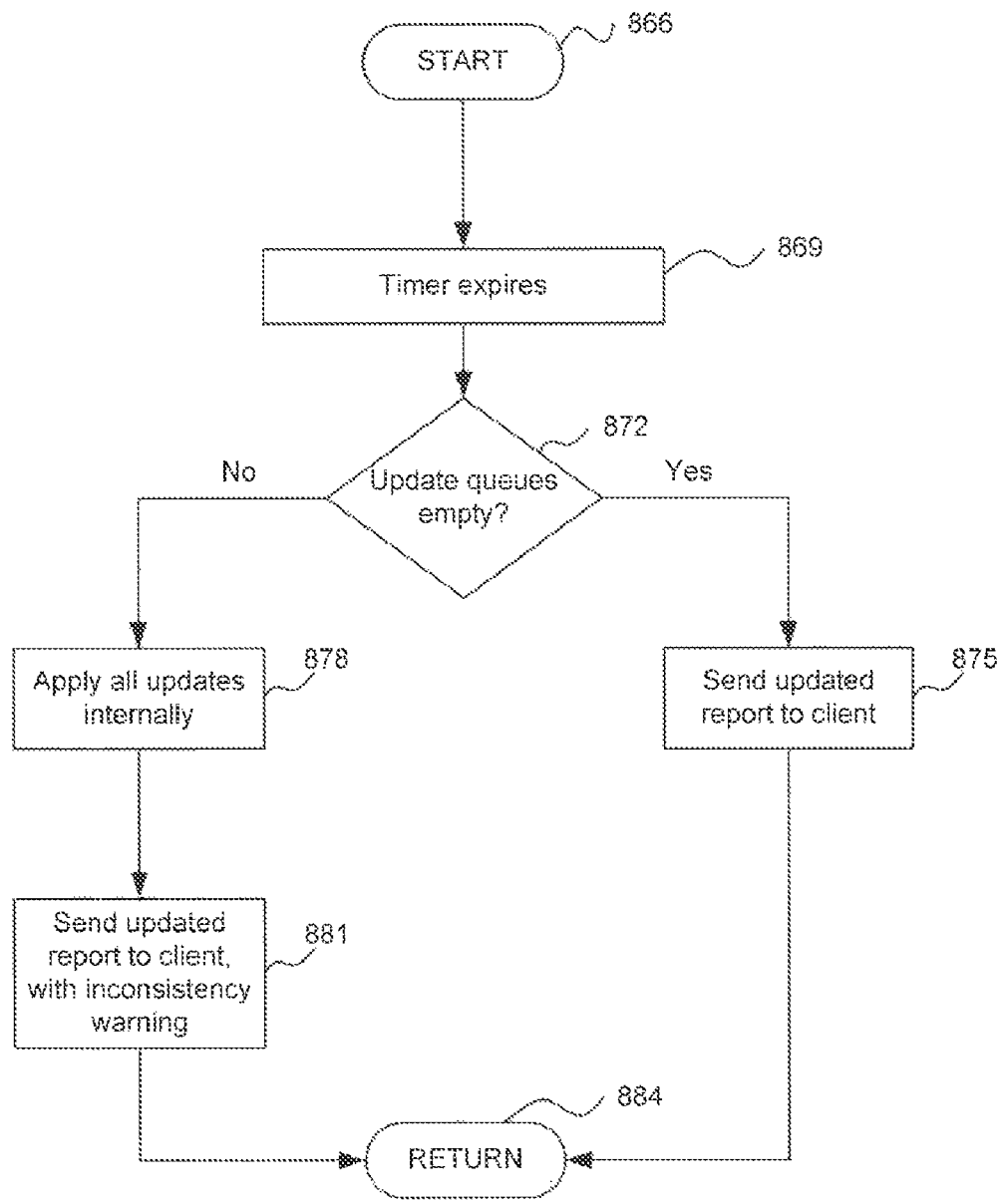

In an embodiment of the invention, a report can be updated as a result of changes to the underlying data. The process of updating a report is illustrated in FIGS. 8A-8C. This process is performed at the intelligence server, based on information provided to it by the tree servers that contribute to the original report. Note that a given intelligence server may be in communication with several tree servers for the purpose of report generation. As a result, updates may likewise come from multiple tree servers, creating a need for synchronization among these components and a need for a consistent state when possible, as will be described below.

The process begins at step 803 of FIG. 8A. In step 806, the loading of a report is initiated. In step 809, a determination is made as to whether the current state of slices, as communicated from the tree servers to the intelligence server, is consistent. Consistency refers to a state where all slices are constructed based upon a consistent view of the underlying data. That is, in such a state, the data across all tree servers used to compute all slices within a given report is consistent. Since each tree server may process a given update at different times, there exists the possibility that the slices can be inconsistent. If there are no changes to the data underlying a report, then there is, by default, a consistent state. Consistency and inconsistency are discussed further below.

If the slices are consistent, then processing continues to step 815, where an updated report is sent to the client by the intelligence server. If the updates are inconsistent, the report is sent to the client in step 812, where the report includes the most current information, even though the information has not been consistently reported to the intelligence server by all tree servers. In this case, the client is also warned of the inconsistent state. This provides the user with current data, but allows the user to make his or her own determination regarding the utility of the data in light of the inconsistency. The process concludes at step 818.

FIGS. 8B and 8C illustrate the receipt, at the intelligence server, of update messages from tree servers, and the subsequent processing of such messages. In FIG. 8B, a new update is received at the intelligence server in step 821. In an embodiment of the invention, the intelligence server saves update messages in queues in step 824, where each queue is dedicated to a given tree server.

In step 827, a determination is made as to whether the consistency of the system can be improved by applying one or more updates from the queues. Generally, each tree server will send several updates to the intelligence server over time. In an embodiment of the invention, each update message affecting the underlying data across all tree servers has a unique ID associated with it. This unique ID is also associated with the resulting recalculated slice, such that a given numbered update from one tree server will correspond to another update from another tree server for the same underlying data change event. For example, assume that there are two tree servers that contribute to a report, and both send updates to the intelligence server such that each has sent update with ID 3. Assume further that no other updates have been received for the report. Then the updates are consistent, since both tree servers have sent an update with ID 3 as their latest one. If one tree server then sends a new update, then the updates are said to be inconsistent, because not all tree servers are at the same point, as indicated by the update message numbers. The tree server that has sent the new update is now the more current of the two tree servers. If the same tree server then sends a fifth update, then the tree servers are now said to be even less consistent, because the other tree server now lags further behind. If this other tree server now sends its fourth update, then the level of consistency has improved, because the tree servers are now closer together in their respective updates. One tree server has sent its fifth update (the most current of all received updates), while the other has sent its fourth. They are now one update apart, instead of two. Consistency is said to improve when, given a tree server that is the most current, any of the other tree servers sends an update that lessens the discrepancy, i.e., brings the tree server closer in the update sequence to the most current tree server.

Generally, the IDs are unique identifiers across all updates, and there may not be an implied order. In an embodiment of the invention, the ID may be a combination of the host name and a timestamp. It is assumed that all recipients of the updates will get the updates in the same order.

If, in step 827, the determination is made that consistency can be improved, then the process continues at step 830. Here, all received updates which improve consistency are removed from their queues and applied to the report at the intelligence server, but the report is not yet sent to the client. In step 833, a determination is made as to whether these updates are completely consistent. If so, then in step 839, the updated report is sent to the client. Otherwise, in step 836 the updated report is sent to the client with an advisory that the updates are not completely consistent.

The process continues at step 851, where a determination is made as to whether the update queues are empty. If so, then a timer is stopped, if running. As will be explained in greater detail below, the timer is used to track the time spent in an inconsistent state. If the queues are not empty at step 851, the process enters a wait state at step 848, awaiting further updates.

If, in step 827, it is determined that the consistency cannot be improved, then the process continues to step 842, to determine if the timer is running. If the timer is not running at this point, then the timer is reset and started (step 845). If the timer is running, then the system enters the wait state at step 848.

Returning to the top of FIG. 8B, when a new message identifier is received at step 857, then a determination is made as to whether the update queues are empty. If so, then the system enters a wait state. If not, then the process continues to step 827, where it is determined whether the level of consistency has improved. The remaining processing shown in this figure is discussed above.

Recall that incoming updates do not necessarily include IDs that imply an ordering. In order to establish the correct order for updates from tree servers, the intelligence server keeps track of all incoming update IDs. This can be useful, e.g., at step 827, when trying to align update IDs across individual update queues.

As noted above, when the timer expires, all updates will be applied. This is provided as a means of keeping the report up to date in the event that a more consistent state is not detected. Generally, if a threshold amount of time is spent in such a state, then the report is updated with all available updates, and sent to the client with an advisory regarding the inconsistency. This process is illustrated in FIG. 8C. The process begins at step 866. At step 869 the timer has expired. At step 872 a determination is made as to whether the update queues are empty. If so, then the updated report is sent to the client in step 875. Otherwise the process continues at step 878. All updates are applied from all queues. At step 881 the updated report is sent to the client with an advisory about the inconsistency of the updates. The process concludes at step 884.

Figure 9A:
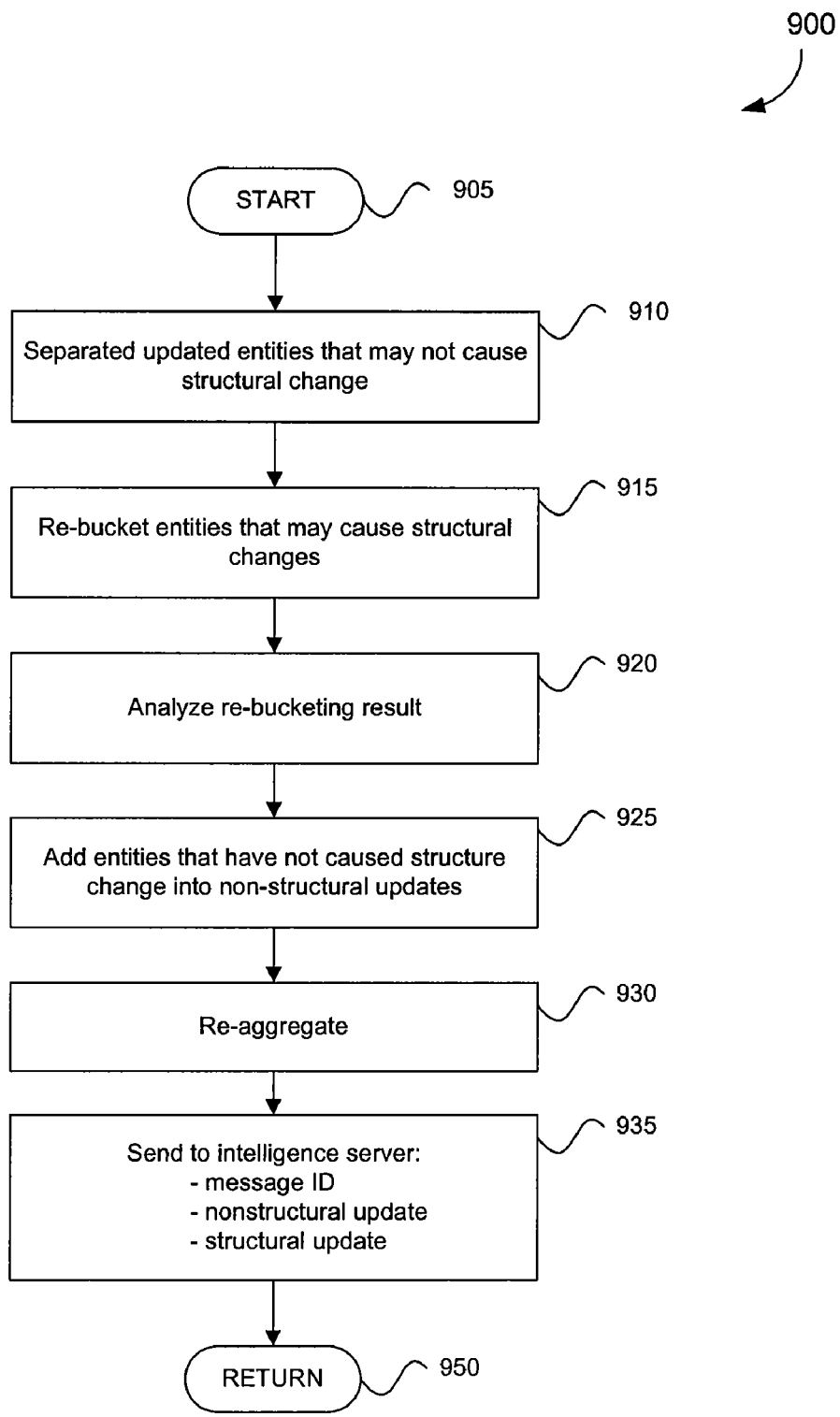
FIGS. 9A and 9B illustrate the process of updating a slice at a tree server, according to an embodiment of the invention.
Figure 9B:
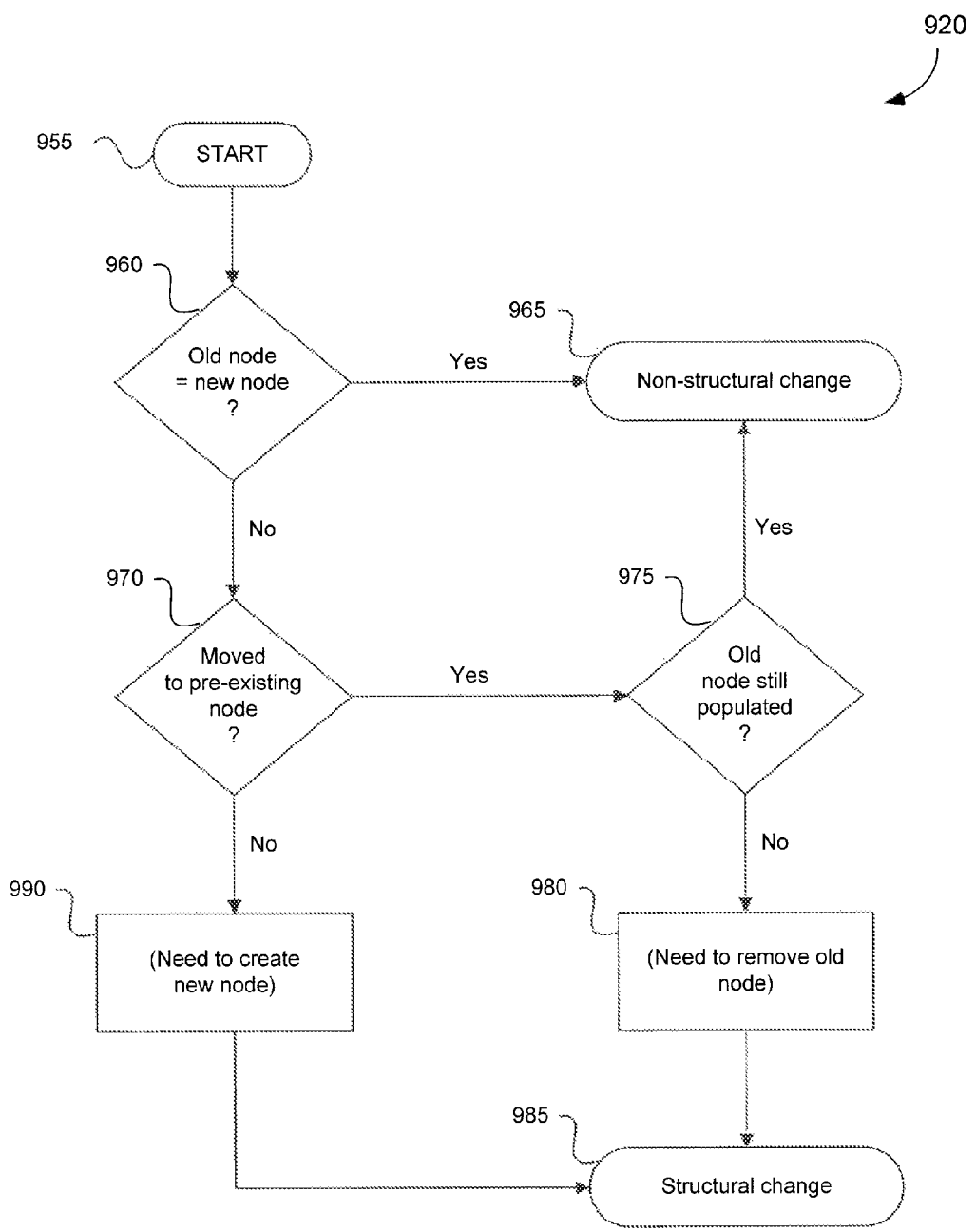

FIGS. 9A and 9B illustrate the processing of updates at the tree servers. Generally, a distinction can be made between changes that affect the slice structure and those that do not. The processing will be different depending on whether structure changes. Moreover, the processing described below limits the amount of information that is sent from a tree server to the intelligence server in reporting an update.

The process begins at step 905. In step 910, entities with updates that cannot cause structural changes are separated. Those updates are changes of values which are not used in the report's grouping rules. A non-structural update is created from these entities.

In step 915, all other entities undergo a re-arrangement, or "re-bucketing" process. During this process, for every entity, a node in the slice is found. This is the node to which the entity belongs after the update is applied to the entity. This process is similar to the original slice generation but applied only to entities needed. Here, any new nodes and branches can be created for the slice. A node also can be removed if there is no entity left in the node. Note that the removal of one or more nodes may leave a higher level node childless. If this is the case, the higher level node can be removed ("pruned") as well. This pruning process may continue as far up the hierarchy of the slice as necessary. As a result a branch of the slice tree can be removed.

In step 920, the result of the re-bucketing is analyzed. It may be found there that some of the entities have not caused a change of the slice tree. In step 925, those entities are added into non-structural update created in step 910.

Step 920 includes logic that analyzes the impact of moving an entity from one node to another. This is illustrated in FIG. 9B. This process begins at step 955. The tree server will know where an entity resided prior to the update (i.e., which node), and where the entity now belongs. These nodes can be viewed as the old and new nodes, respectively. This also covers the cases when an entity is removed (new node is null) or a new entity is added (old node is null). In step 960, a determination is made as to whether the old node is the same as the new node. If so, the entity has not been relocated, so that this update is a non-structural change as shown in step 965.

If the new node is different from the old node, the process continues at step 970. Here a determination is made as to whether the entity has been moved to a pre-existing node. If so, and if the old node is still populated (as determined in step 975), then the change does not affect the structure of the slice, as shown at step 965. If the old node is no longer populated, then the old node will need to be removed, as shown in step 980. This represents a structural change to the slice (step 985).

If, in step 970, the entity has not been moved to a pre-existing node, then the entity has been moved to a node that did not previously exist. A new node will therefore be necessary (step 990). This represents a structural change (step 985).

Returning to the FIG. 9A, the process continues to step 930. Here, re-aggregation is performed as necessary.

In step 935, an update message is sent to an intelligence server. This message contains only information that the intelligence server needs to update the report tree accordingly. The message consists of an ID for the update message, any non-structural update and any structural update. The non-structural update part of the message, for each affected node, contains a node ID, the values affected by re-aggregation, any new entity, the ID of any removed entity and, for any changed entity, its ID and the values changed. The structural update part of the message consists of any new branches in the slice and identities of the roots of any removed branches. The process concludes at step 950.

Figure 10:
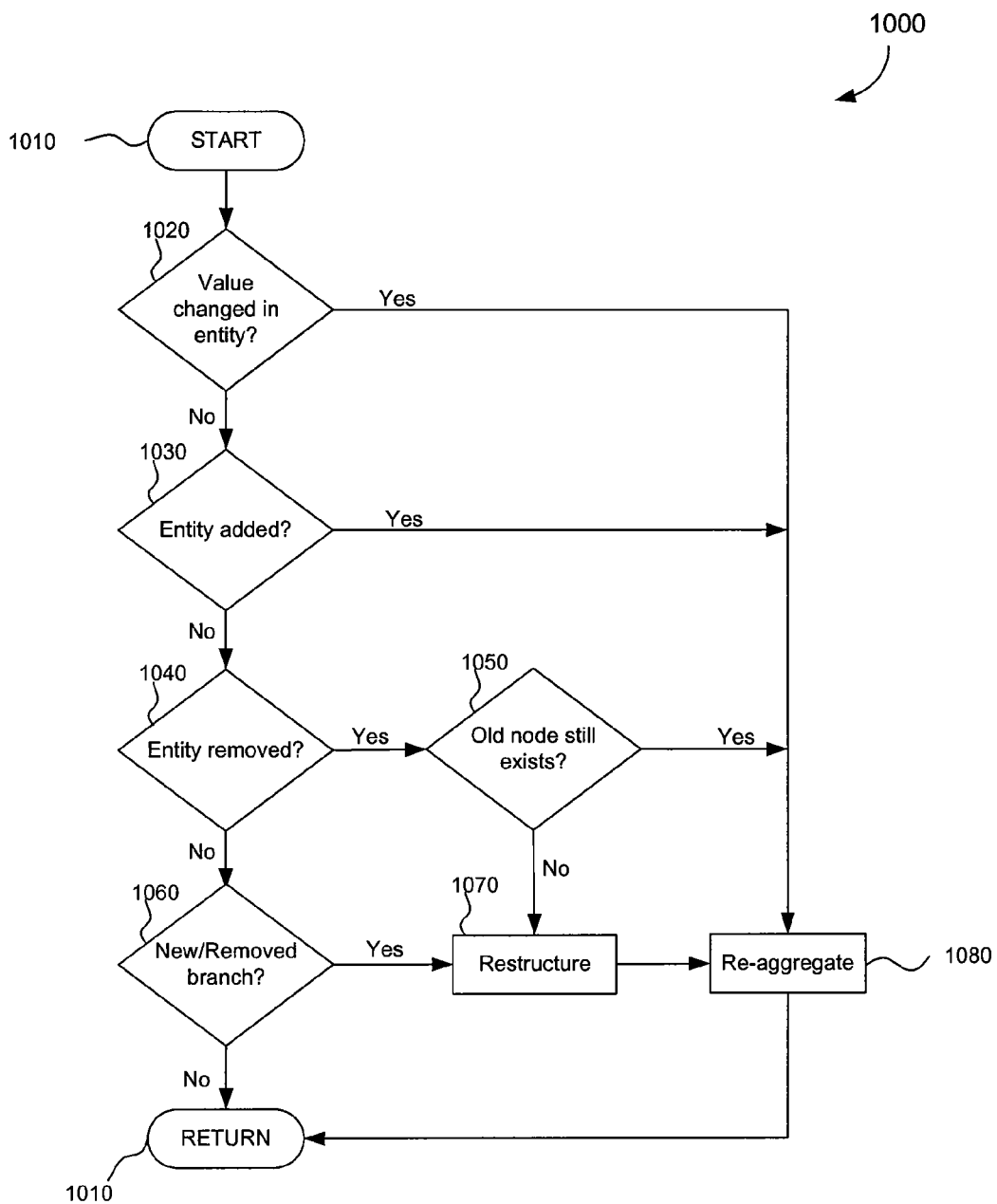
FIG. 10 illustrates the restructuring of a tree as may be required after an update, according to an embodiment of the invention.

The revision of a report as the result of an update is illustrated in FIG. 10. The process begins at step 1010. If, in step 1020, only a value has been changed, then re-aggregation takes place in step 1080. Otherwise the process continues at step 1030. Here a determination is made as to whether only an entity has been added, i.e., an additional value, rather than just a modification of an existing value. If so, then re-aggregation is necessary at step 1080. If, in step 1040, it is determined that an entity has been removed, but the associated node still exists (step 1050), then again re-aggregation is necessary. Note that all of these changes are non-structural, in that the tree remains in its present form, though values in the nodes may have changed.

If, in step 1050, it is determined that the node from which the value was removed no longer exists, then re-structuring of the tree is necessary in step 1070. This is followed by re-aggregation in step 1080. Also, if a new branch results from an applied update (as determined in step 1060) or it has been determined that a branch has been removed, then restructuring of the tree is necessary in step 1070, followed by re-aggregation. The process concludes at step 1090.

The processing described above with respect to FIGS. 8A, 8B, 8C, 9A, 9B, and 10 can be implemented in hardware, firmware, software, or any combination above. In an embodiment of the invention, the tree servers and intelligence server are off-the-shelf computers, such as servers, that are programmed to perform the above processes. Any apparatus or manufacture comprising a computer useable or readable medium having control logic (software) stored therein is referred to herein as a computer program product or program storage device. Such computer program products, having control logic stored therein that, when executed by one or more computers, cause such computers to operate as described herein, represent embodiments of the invention.

VII. Conclusion

It is to be appreciated that the Detailed Description section, and not the Abstract section, is intended to be used to interpret the claims. The Abstract section may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method of creating a report for a user at a client computer on the basis of a plurality of remote datasets stored at one or more databases, comprising:

receiving a report definition at each of a plurality of tree servers implemented on different respective computers coupled in a network in parallel between the client computer and the one or more databases storing the datasets;

creating one or more respective slices of the report at each respective tree server, wherein the slices are represented at each respective tree server as subtrees including leaf nodes, including:

requesting, at each respective tree server in parallel between the client computer and the one or more databases storing the datasets, one or more respective datasets from a database coupled to the respective tree server, receiving at each respective tree server the requested one or more respective datasets, constructing at each respective tree server one or more slices of the report, based on the report definition, and populating the leaf nodes of the one or more slices at each respective tree server using the respective datasets received at the respective tree server;

sending the one or more constructed slices with populated leaf nodes from each respective tree server to an intelligence server;

merging, at the intelligence server, using at least one processor, the one or more constructed slices with populated leaf nodes to construct a tree data structure; and
converting the constructed tree data structure into a report for sending to a client for display.

2. The method of claim 1, further comprising:
creating an update message at a respective tree server having datasets that are updated in a respective subtree with populated leaf nodes.

3. The method of claim 2, wherein creating an update message at a respective tree server further comprises:
determining whether updating a slice requires restructuring of the subtree; and
if so, restructuring the subtree including pruning or combining one or more populated leaf nodes.

4. A method of creating a report on the basis of a plurality of remote datasets, comprising:
receiving, at an intelligence server implemented on a computer, a report definition;
receiving, at the intelligence server, one or more slices of the report from a plurality of respective tree servers, wherein the slices are represented as subtrees whose leaf nodes are defined by data from the plurality of datasets;
merging the respective slices from each of the plurality of respective tree servers to form a tree;
aggregating data in the tree;
converting the tree into the report;
presenting the report to a client computer for display;
processing updates to the datasets at different subtrees of the tree servers, wherein processing an update comprises:
saving the update in a queue associated with the tree server from which the update was received,
determining differences among the number of updates saved in different queues associated with different tree servers,
when differences among the number of updates saved in different queues can be reduced:
applying any queued updates to generate an updated report, and
presenting the updated report to the client computer for display,
if the queue and all other queues associated with respective tree servers are empty, stopping a timer, if running, and
when differences among the number of updates saved in different queues cannot be reduced, starting a timer if the timer is not currently running; and
informing the client computer of an inconsistent state when a different number of updates were processed in different subtrees for slices included in the report.

5. The method of claim 4, further comprising:
receiving an update from one of the tree servers; and
processing the update on the basis of a consistency of a set of received updates.

6. The method of claim 4, wherein processing the update further comprises, if the timer expires:
determining if the queue and all other queues associated with respective tree servers are empty;
if so, sending the updated report to the client computer; and
if not, applying any queued updates to generate the updated report, sending the updated report to the client computer, and informing the client computer of an inconsistent state.

7. A system for creating a report for a user at a client computer on the basis of a plurality of remote datasets comprising:
a plurality of tree servers implemented by one or more processors coupled in a network in parallel between the client computer and one or more databases storing the remote datasets, each configured to:
receive a report definition,
create respective slices of the report at each of the plurality of tree servers, wherein the slices are represented as subtrees including leaf nodes, wherein creating respective slices of the report includes:
requesting one or more remote datasets from a database,
receiving the remote datasets,
constructing one or more slices of the report, based on the report definition, and
populating the leaf nodes of the respective slice, using the received remote datasets; and
an intelligence server in communication with the plurality of tree servers and configured to:
receive the created slices of the report from respective tree servers,
receive the report definition,
merge the slices to form a tree,
aggregate data in the tree,
convert the tree into the report, and
present the report to the client, wherein the tree servers are each further configured to process updates to respective datasets send the updates to the intelligence server, and the intelligence server is further configured to:
receive the processed updates from respective tree servers,
generate an updated report based on the received updates, and
further process the updates such that a difference between a number of updates received from different tree servers is reduced prior to presenting the updated report to the client.

8. The system of claim 7, wherein creation of an update at the least one tree server determines whether updating a slice requires restructuring of the slice; and
if so, restructures the slice.

* * * * *